June 30, 1964  C. E. SCHUTTE  3,139,303
VENT WING ASSEMBLY
Filed Sept. 18, 1961  2 Sheets-Sheet 1
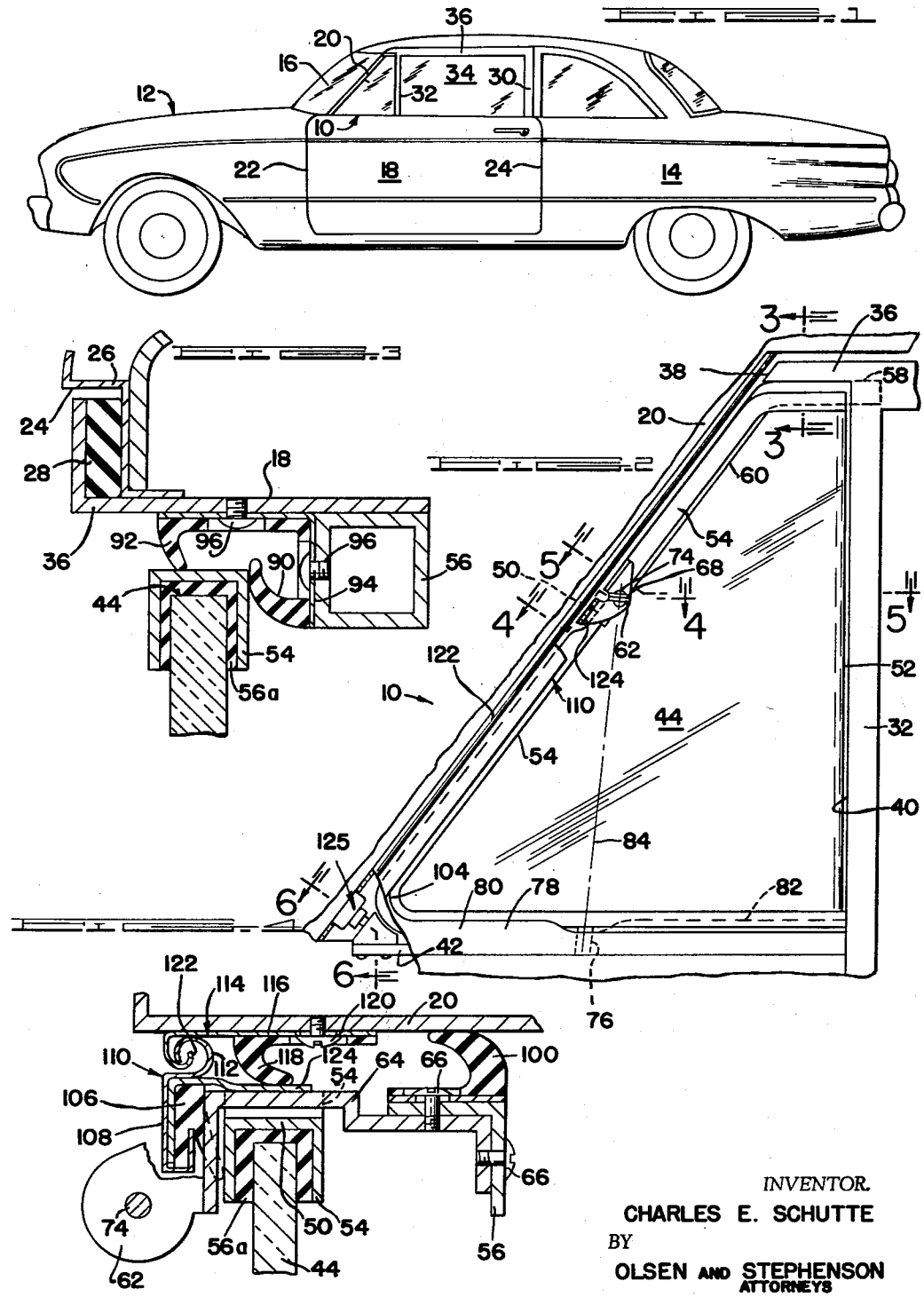
INVENTOR.
CHARLES E. SCHUTTE
BY
OLSEN AND STEPHENSON
ATTORNEYS

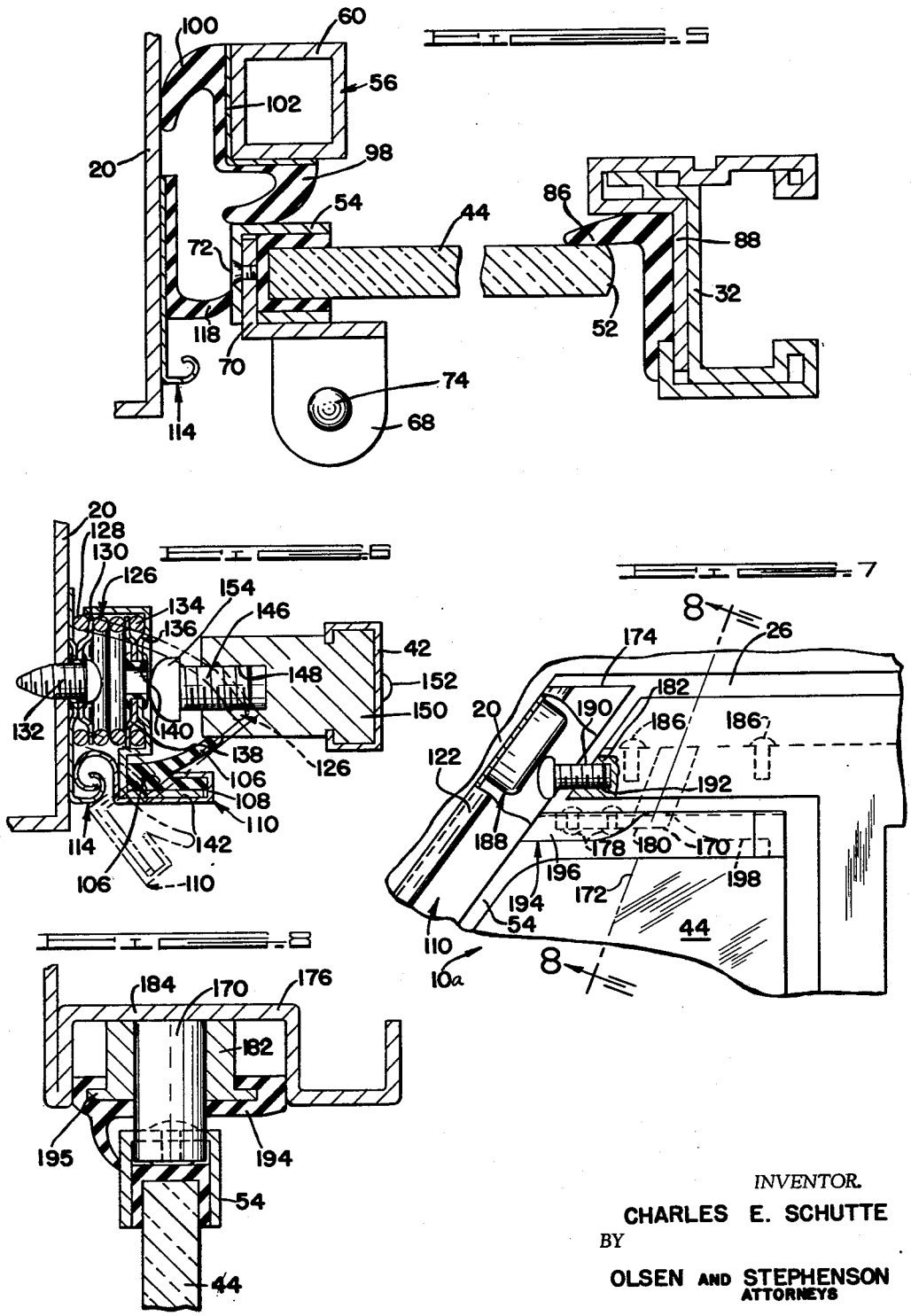

З,139,303
VENT WING ASSEMBLY
Charles E. Schutte, 675 Anita Ave.,
Grosse Pointe Woods 36, Mich.
Filed Sept. 18, 1961, Ser. No. 138,638
11 Claims. (Cl. 296—44)

This invention relates generally to automobile vehicle window assemblies and more particularly to an improved vent wing assembly which does not require the usual door post.

The conventional automobile has its front doors provided with the usual roll down windows and generally triangularly or irregularly shaped vent wings which are pivotally mounted on the doors at positions forwardly of the roll down windows. Heretofore, each door has included a front post which, in the closed position of the door, is disposed adjacent and substantially parallel to the post which supports the adjacent end of the windshield. Each vent wing is then mounted so that when closed it seals against the front door post and the front track for the adjacent roll down window. The front door post, which is objectionable primarily because it obscures driver and occupant vision and also because it adds bulk to the appearance of the vehicle, has thus heretofore been a necessary component in automobile front doors because it provides a surface against which the front edge of the vent wing seals. It is an object of this invention, therefore, to provide an improved vent wing assembly which eliminates the necessity for the door post, thus providing a vehicle having improved driver and occupant visibility and a slimmer and thus improved appearance.

A further object of this invention is to provide an improved vent wing assembly in which at least a portion of the weather seal therefor is mounted on the adjacent windshield post and is mounted so that it automatically moves out of the path of the vent wing on opening of the door on which the vent wing is mounted.

Further objects, features and advantages of this invention will become apparent from the consideration of the following description, the appended claims, and the accompanying drawing in which:

FIGURE 1 is a side elevational view of an automobile provided with the improved vent wing assembly of this invention;

FIGURE 2 is an enlarged fragmentary elevational view of the vent wing assembly shown in FIG. 1 with some parts broken away and other parts shown in section for the purpose of clarity;

FIGURE 3 is an enlarged transverse sectional view of the vent wing assembly looking substantially along the line 3—3 of FIG. 2;

FIGURES 4, 5 and 6 are enlarged transverse sectional views of the vent wing assembly looking substantially along the lines 4—4, 5—5 and 6—6, respectively, in FIG. 2;

FIGURE 7 is a fragmentary side elevational view of the upper portion of a modified form of the vent wing assembly of this invention; and FIGURE 8 is a transverse sectional view looking substantially along the line 8—8 in FIG. 7.

With reference to the drawing, the vent wing assembly of this invention, indicated generally at 10, is illustrated in FIG. 1 mounted on an automotive vehicle 12 which includes the usual body 14, windshield 16 and a front door 18. The windshield 16 is supported at its ends on upwardly extending posts or frame members 20, only the one of which is shown which is adjacent the door 18, which form a part of the body 14, and the door 18 is pivotally mounted at its front side 22 on concealed hinges (not shown) so that it can be swung outwardly of the vehicle 12 to an open position. In its closed position, the door 18 fits within an opening 24 in the body 14 which is bounded at its upper end by a roof frame member 26 (FIG. 3), and a suitable weather seal 28 is provided on the door 18 so as to close any space between the door and the body opening 24 when the door is closed. The door 18 also includes an upright window frame member 30, an upright track member 32 spaced forwardly of the frame member 30, and the usual roll down window 34 which is supported during its up and down movement on the members 30 and 32. A top frame member 36 on the door 18 extends forwardly from the frame member 30 to a position such that its forward end 38 (FIG. 2) is adjacent the windshield frame member 20 and, in the illustrated embodiment of the invention, is slightly forwardly of the track 32. The door 18 thus cooperates with the adjacent windshield frame member 20 to form a window opening 40 which is bounded on its rear side by the window track 32 and on its forward side by the frame member 20. The top door frame member 36 defines the top of the opening 40 and a channel shape frame member 42 in the door 18 defines the lower side of the opening 40.

The vent wing assembly 10 includes a glass panel 44 which is of an irregular shape determined by the styling of the automobile 12 and adapted to close the opening 40. In the illustrated embodiment of the invention, the panel 44 is substantially trapezoidal in shape, and has a continuous reinforcing strip 54, which is of channel shape and carries a channel shape gasket 56a formed of rubber or the like, extended about its top, front and bottom edges. The rear edge 52 of the panel 44 is without any covering, in the illustrated embodiment of the invention although it is to be understood that in some forms of the invention the top, bottom and rear edges of the panel 44 may be reinforced, without reinforcing the front edge if desired.

The assembly 10 also includes a hinge supporting beam 56 which, over the greatest portion of its length, is of box shape in transverse section (FIGS. 3 and 5) and has a substantially horizontal portion 58 (FIG. 2) which is secured to the top door frame member 36 and extends forwardly to the front end 38 of the door frame member 36. The beam 56 also includes a downwardly and forwardly inclined front end portion 60 which is substantially parallel to the windshield frame member 20 in the closed position of the front door 18. A lower end section of the beam portion 60 is of an angle shape (FIG. 4) and a hinge plate 62 has a laterally extending leg 64 which is secured to the angle shape beam section by mounting screws 66. As shown in FIGS. 2 and 4, the strip 54 has an inwardly recessed portion 50 to thus provide a space through which the leg 64 can project into engagement with the beam 56.

A second hinge plate 68 (FIG. 5) which is also substantially horizontal, has a laterally extending leg 70 which extends into the reinforcing strip 54 and is secured thereto by screws 72. The hinge plates 62 and 68 are arranged so that the plate 62 is below the plate 68 and the hinge plates are connected by a rivet or pivot member 74 which is axially aligned with a pivot pin 76 secured to the reinforcing strip 54 at the lower edge of the panel 44 and rotatably mounted in an opening (not shown) in the door frame member 42. The panel 44 is thus supported on the hinge plate 62 for rotatable movement about an axis 84 extending through the pivot members 74 and 76. As will more clearly appear hereinafter, when the panel 44 is moved to an open position, the portion rearwardly of the axis 84 moves outwardly of the vehicle and the portion forwardly of the axis 84 moves inwardly of the vehicle. The beam 56, below the pivot 74, is of the illustrated angle shape to avoid interference with the panel 44 when it is opened.

A conventional weather strip member 78, formed of rubber or the like, is secured to the door frame member 42 and has a first portion 80 which is forwardly of the pivot pin 76 and located outside the vent wing panel 44, and a second portion 82 which is disposed rearwardly of the pivot pin 76 and is on the inside of the panel 44 when it is closed. On opening movement of the vent wing panel 44, it rotates about the axis 84 extending through the pivot members 74 and 76 and the portion of the panel 44 forwardly of the axis 84 is moved in a direction inwardly of the vehicle and the portion rearwardly of the axis 84 is moved outwardly of the vehicle. Thus, when the panel 44 is moved to its position closing the opening 40, the reinforcing strip 54 at the lower edge of the panel 44 is moved into sealing engagement with the portions 80 and 82 of the rubber sealing strip 78. The rear edge 52 of the panel 44 (FIG. 5) is moved into engagement with a rubber seal strip 86 which is bonded to a bracket 88, of irregular shape, which is mounted on the door track member 32 and is secured at its upper end to the beam portion 58. The reinforcing strip 54 at the top edge and the portion of the front edge of the panel 44 rearwardly of the axis 84 engage weather seals mounted on the beam 56. The reinforcing strip 54 along the top edge of the panel 44 is movable against an outwardly extending weather seal member 90 carried by the beam 56 and a downwardly extending weather seal member 92 carried by the door frame member 36. The seal members 90 and 92 are mounted on an angle 94 which is secured to the beam portion 58 and the door frame member 36 by screws 96.

The reinforcing member 54 along the front edge of the panel 44 and disposed rearwardly of the axis 84 is movable against a weather seal member 98 which projects outwardly from the portion 60 of the beam 56. A second seal member 100 extends forwardly from the beam portion 60 into sealing engagement with the windshield frame member 20 as shown in FIG. 5. The seal members 98 and 100 are mounted on an angle plate 102 which is secured to the beam portion 60 so that the seal members 98 and 100 are engageable with the panel reinforcing strip 54 and the windshield post 20 when the vent wing panel 44 and the door 18 are closed, respectively.

The portion of the reinforcing strip 54 located between the pivot pin 74 and the lower end 104 of the front edge of the panel 44 moves inwardly of the vehicle 14 when the vent wing panel 44 is opened, since it is located forwardly of the axis 84. When the vent wing panel 44 is closed, this portion of the reinforcing strip 54 seals against an elongated seal strip 106 (FIGS. 4 and 6) which is of a resilient rubber or the like construction, and is supported on a channel shape portion 108 of a bracket 110 having a return bent edge portion 112. Both the seal strip 106 and the bracket 110 terminate at their upper ends slightly below the pin 74. A mounting bracket 114 has a leg portion 116 which carries a fixed seal strip 118 and is secured by screws 120 to the windshield post 20. The mounting bracket 114 also has a return bent edge portion 122 which is interfitted with the edge portion 112 of the supporting bracket 110 to form a hinge connection between the brackets 110 and 114 so that the seal member 106 is pivotally movable about an axis substantially parallel to the post 20. Intermediate its ends, the seal member 118 projects into sealing engagement with an L-shape actuating arm 124 secured within the channel shape portion 108 of the seal supporting bracket 110, and at its upper and lower ends, the seal member 118 projects into sealing engagement with the reinforcing strip 54 on the front edge 46 of the panel 44.

A spring actuating assembly 125 for the seal strip 106 is provided at the lower front corner of the assembly 10.

The assembly 125 includes a coil spring 126 which has one end coil 128 clamped between a disk 130 and the mounting bracket 114 and is secured to the windshield post 20 by a screw 132. The opposite end coil 134 in the spring 126 is inserted to a cup member 136 by means of a disk 138 and a rivet 140 which operates to clamp the end coil 134 between the cup member 136 and the disk 138. The cup member 136 has a laterally extending irregularly shaped leg 142 which is secured to the channel shape portion 108 of the bracket 110. It can thus be seen that the coil spring 126 is effectively connected to and extends between the windshield post 20 and the supporting bracket 110 for the movable seal strip 106. The spring 126 is stressed so that it tends to assume the curved broken line position shown in FIG. 6 in which it extends rearwardly and outwardly of the vehicle 12 from the windshield post 20. Movement of the spring 126 to this position effects pivotal movement of the seal supporting bracket 110 about its hinge connection on the mounting bracket 114 so as to pivot the seal member 106 away from the reinforcing strip 54 at the forward edge 46 of the vent wing panel 44.

The coil spring 126 is maintained in its compressed position shown in solid lines in FIG. 6 in the closed position of the door 18 by a spring compressing pin 146 which is adjustably threaded into a threaded opening 148 in an irregularly shaped block 150, which is supported on and secured to the door frame member 42 by screws 152. The pin 146 is mounted in the opening 148 so that when the door 18 is closed, the head 154 of the pin 146 engages either the cup shape member 136 or the rivet 140 and compresses the spring 126. When the spring 126 is moved from its extended to its compressed position, it pulls the seal supporting bracket 110 about its hinge support in a direction such that the seal 106 is moved into sealing engagement with the reinforcing strip 54 on the front edge of the panel 44 below the pivot 74.

In operation, assume that the vent wing panel 44 is in a position closing the opening 40 and that it is desired to move the panel to its open position. The panel 44 is rotated about the axis 84 by any suitable means such as a handle (not shown) connected to the panel, so that the portion of the panel 44 rearwardly of the axis 84 is moved in a direction outwardly of the vehicle 14 and the portion of the panel 44 forwardly of the axis 84 is moved inwardly of the vehicle. During such movement, the rear edge of the panel 52 moves away from its sealing strip 86 and the reinforcing strip 54 is moved away from the various sealing strips with which it is engaged when the vent wing panel 44 is closed. On closing of the panel 44, it is rotated in a reverse direction so that the rear edge 52 is moved into engagement with the seal strip 86 as shown in FIG. 5, and the portion of the reinforcing strip 54 above the pivot and rearwardly of the pivot 74 is moved into engagement with the seal strips 90 and 98 on the beam 56, which terminates just below the pivot 74, as shown in FIG. 2. The portion of the reinforcing strip 54 below the pivot 74 moves outwardly into engagement with the seal strip 106 mounted on the bracket 110 and the portion of the reinforcing strip 54 on the lower edge of the panel 44 moves into sealing engagement with the strip 78. Since the pivot 74 is slightly rearwardly of the front edge of the strip 54 a very small portion of the strip 54 above the pivot 74 will move slightly inwardly of the vehicle when the panel 44 is opened. However, as shown in FIG. 5 the strip 98 is sufficiently yieldable to accommodate such slight movement.

With the vent wing panel 44 in its closed position, assume that the door 18 is to be opened so that the reinforcing strip 54 on the forward edge of the panel 44 will be swung outwardly and forwardly about the door hinges (not shown). The portion of the strip 54 above the pivot member 74 is free to swing outwardly without obstruction, as shown in FIG. 5. However, in order for the portion of the strip 54 below the pivot 74 to swing outwardly, the seal strip 106 must be moved out of the path of travel of the reinforcing strip 54. Immediately upon opening movement of the door 18, the head 154 of the actuating pin 146 is moved out of engagement with the spring actuating assembly 125. Consequently, since the force which maintains the spring 126 in its compressed position, shown in solid lines in FIG. 6, is removed, the spring 126 immediately starts to assume its extended position shown in broken lines in FIG. 6 so that as the door 18 is progressively opened, the seal strip bracket 110 is progressively swung outwardly about its hinged support on the mounting bracket 114 so that the seal member 106 is progressively moved out of the path of travel of the vent wing panel 44, as the panel 44 is moving outwardly with the door 18. As a result, the door 18 can be fully opened without any interference from the seal strip 106 and its supporting bracket 110.

When the door 18 is closed, the head 154 of the actuating pin 156 engages the rivet 140 or the cup shape member 136, depending upon the exact locations of these members, and progressively compresses the spring 126. As the spring 126 is compressed, it moves the leg 142 on the cup shape member 136 in a direction to pivot the seal supporting bracket 110 about its hinge support in a direction such that the seal 106 is moved toward its sealing position in which it engages the vent wing reinforcing strip 54. When the door has been fully closed, the spring 126 has been fully compressed so that the bracket 110 has been returned to its original position in which the seal strip 106 is pulled into pressure engagement with the adjacent portion of the vent wing reinforcing strip 54.

As best appears in FIG. 2, since the assembly 125 is located adjacent the lower end of the bracket 110, the entire force on the bracket 110 tending to return it to its original position in which the seal strip 106 engages the reinforcing strip 54 is adjacent the lower end of the bracket 110. To insure a similar return movement of the upper end of the bracket 110 to its original sealing position, the actuating arm 124 (FIGS. 2 and 4) is secured to the bracket 110 adjacent its upper end in a position in which it will be engaged by the hinge plate leg 64. As a result, in the event there is any tendency of the upper end of the bracket 110 to remain in a position in which the seal strip 106 is spaced from the reinforcing strip 54, the engagement of the leg 64 with the arm 124 on closing of the door will insure movement of the upper end of the bracket to the desired sealing position.

A modified vent wing assembly 10a is illustrated in FIGS. 7 and 8 which is identical to the assembly 10 except that the pivot pin 74 is replaced by a pivot pin 170 disposed above the vent wing panel 44 so that the panel 44 will rotate about an axis 172 which extends through the upper pin 170 and a lower pin (not shown) located in approximately the position of the pin 76 in the assembly 10 and axially aligned with the pin 170. Thus, in the assembly 10a the entire forward edge of the panel 44 is located forwardly of the axis of rotation 172 for the panel 44, thus eliminating the requirement for the hinge supporting beam 56. Like numerals are used therefore in the assembly 10a to indicate like parts in the assembly 10. In the assembly 10a, the bracket 110 is in all respects identical to the bracket 110 in the assembly 10 except that it extends over the full length of the forward edge of the panel 44 and terminates at its upper end 174 at a position forwardly of and above a top door frame member 176 which corresponds, in the assembly 10a, to the door frame member 36 in the assembly 10.

The pin 170 is secured to the reinforcing strip 54 by rivets 178 which extend through a leg 180 formed integral with the lower end of the pin 170 and extended forwardly therefrom. At its upper end, the pin 170 is rotatably supported in a body member 182 which is secured to an intermediate channel shape portion 184 of the frame member 176 by means of screws 186. A spring actuating assembly 180, which is substantially identical to the assembly 125 previously described is secured to the windshield post 20 adjacent its upper end. The assembly 188 is controlled by an actuating pin 190, like the pin 146 that controls the assembly 125, which is adjustably mounted in a threaded opening 192 in the forward end of the body member 182. Thus the seal supporting bracket 110 in the assembly 10a is spring moved between its sealing and out-of-the-way positions by a pair of spring actuating assemblies 125 and 188 mounted on the windshield post 20 adjacent the lower and upper ends of the bracket 110. When the door 18 is opened, the assemblies 125 and 188 move the bracket 110 and the seal 106 carried thereby out of the path of travel of the vent wing panel 44, and when the door 18 is closed, engagement of the pins 146 and 190 with the assemblies 125 and 188, respectively, insures operation of the spring assemblies 125 and 188 to move the seal strip 106 to a position engaging the reinforcing strip 54 on the forward edge of the vent wing panel 44. A conventional seal strip 194 is mounted on a lateral flange 195 formed on the lower side of the body member 182 so that the portion 196 of the seal member 194 which is forwardly of the axis 172 will engage the outside of the vent wing panel reinforcing strip 54 when the vent wing panel reinforcing strip 54 when the vent wing is closed and a portion 198 of the seal member 196 which is located rearwardly of the axis 172 engages the inside surface of the vent wing panel reinforcing strip 54 when the vent wing is closed.

From the above description it is seen that this invention provides vent wing assemblies 10 and 10a which do not require a front door post for mounting in the front door of an automotive vehicle. As a result, better visibility for the vehicle driver and occupants is obtained and the appearance of the vehicle is improved. In the closed positions of the vent wing panels 44, they are fully weather sealed by the plurality of weather seals mounted on the door and the movable weather seals 106 which are mounted on the windshield post 20. In both assemblies, the seal 106 is secured to a supporting bracket 110 which holds the seal in engagement with the vent wing when the door is closed and moves the seal outside the path of travel of the vent wing when the door is opened. In the assembly 10, the bracket 110 is moved by the single spring assembly 125 and in the assembly 10a the bracket 110, which extends the full length of the forward edge of the vent wing is moved by a pair of substantially identical spring actuating assemblies 125 and 188.

It will be understood that the vent wing assemblies which are herein disclosed and described are presented for purposes of explanation and illustration and are not intended to indicate limits of the invention, the scope of which is defined by the following claims.

What is claimed is:

1. In an automotive vehicle having a windshield and a frame for said windshield which includes an upwardly extending frame member at one side of said vehicle, a door mounted on said one side of said vehicle for swinging movement between open and closed positions, said door including frame means which cooperates with said frame member in the closed position of said door to define a window opening bounded on the forward side by said frame member, a vent wing movably mounted on said door for pivotal movement about an upright axis to a closed position closing said opening, and yieldable seal means mounted on said frame member and engageable with the outer surface of said vent wing adjacent the forward edge thereof in said closed position of said vent wing.

2. In an automotive vehicle having a windshield and a frame for said windshield which includes an upwardly extending frame member at one side of said vehicle, a door mounted on said one side of said vehicle for swinging movement between open and closed positions, said door including frame means which cooperates with said frame member in the closed position of said door to define a window opening bounded on one side by said frame member, a vent wing movably mounted on said door for movement to a closed position closing said opening, and seal means movably mounted on said frame member for movement between a position engaging said vent wing in the closed position thereof and a position to one side of the path of travel of said vent wing during movement of said door from a closed to an open position.

3. In an automotive vehicle having a windshield and a frame for said windshield which includes an upwardly extending frame member at one side of said vehicle, a door mounted on said one side of said vehicle for swinging movement between open and closed positions, said door including frame means which cooperates with said frame member in the closed position of said door to define a window opening bounded on one side by said frame member, a vent wing movably mounted on said door for movement to a closed position closing said opening, a seal strip pivotally mounted on said frame member at a position engagable with the outside of said vent wing in the closed positions of said door and vent wing, and means mounted on said frame member and operatively associated with said seal strip for effecting pivotal movement of said strip to a position out of the path of travel of said vent wing during movement of said door from said closed toward an open position.

4. In an automotive vehicle having a windshield and a frame for said windshield which includes an upwardly extending frame member at one side of said vehicle, a door mounted on said one side of said vehicle for swinging movement between open and closed positions, said door including frame means which cooperates with said frame member in the closed position of said door to define a window opening bounded on one side by said frame member, a vent wing hingedly mounted on said door for pivotal movement about an upright axis to a closed position closing said opening, a seal strip formed of a yieldable material and pivotally mounted on said frame member at a position engageable with the outside of said vent wing in the closed positions of said door and vent wing, and spring means mounted on said frame member and operatively associated with said seal strip for effecting pivotal movement of said strip to a position out of the path of travel of said vent wing during movement of said door from said closed toward an open position.

5. In an automotive vehicle having a windshield and a frame for said windshield which includes an upwardly extending frame member at one side of said vehicle, a door mounted on said one side of said vehicle for swinging movement between open and closed positions, said door including frame means which cooperates with said frame member in the closed position of said door to define a window opening bounded on the forward side by said frame member, a vent wing movably mounted on said door for movement to a closed position closing said opening, yieldable seal means mounted on said frame member and engageable with said vent wing in said closed position thereof, a seal strip pivotally mounted on said frame member at a position engageable with the outside of said vent wing adjacent the forward edge thereof in the closed positions of said door and vent wing, and spring means mounted on said frame member at a position below the lower end of the forward edge of said vent wing and connected to said seal strip for effecting pivotal movement of said strip to a position out of the path of travel of said vent wing during movement of said door from said closed toward an open position.

6. In an automotive vehicle having a windshield and a frame for said windshield which includes an upwardly extending frame member at one side of said vehicle, a door mounted on said one side of said vehicle for swinging movement between open and closed positions, said door including frame means which cooperates with said frame member in the closed position of said door to define a window opening bounded on the forward side by said frame member, a vent wing having a downwardly and forwardly inclined front edge and pivotally mounted on said door for rotatable movement about an upright axis located intermediate the upper and lower ends of said forward edge between a closed position in which said forward edge is adjacent said frame member and an open position in which a first portion of said forward edge located forwardly of said axis extends inwardly of said vehicle, yieldable seal means mounted on said frame member and engageable with another portion of said forward edge rearwardly of said axis in said closed position thereof, a seal strip pivotally mounted on said frame member at a position engageable with the outside of said first portion of said forward edge in the closed positions of said door and vent wing, and spring means mounted on said frame member and connected to said seal strip for effecting pivotal movement of said strip to a position out of the path of travel of said vent wing during movement of said door from said closed toward an open position.

7. In an automotive vehicle having a windshield and a supporting post for one side of said windshield located on one side of said vehicle, a door and window assembly hingedly mounted on said one side of said vehicle for movement between a closed position in which a portion of said assembly is positioned adjacent and substantially parallel to at least a portion of said post and an open position in which said assembly extends outwardly of said vehicle, said portion of said assembly having an outer surface which moves outwardly of said vehicle on swinging movement of said assembly toward said open position, a seal strip hingedly mounted on said windshield post in a position engageable with said outer surface of said assembly portion in the closed position of said assembly, spring means mounted on said post and connected to said seal strip and operable to move said strip to a position outside the path of travel of said assembly portion on movement of said assembly to its open position, and means on said assembly engageable with said spring means on movement of said assembly to its closed position for returning said seal strip to a position engageable with said assembly portion.

8. In an automotive vehicle having a windshield and a supporting post for one side of said windshield located on one side of said vehicle, a front door and vent wing assembly hingedly mounted on said one side of said vehicle for movement between a closed position in which the front edge of said vent wing is positioned adjacent and substantially parallel to at least a portion of said post and an open position in which said assembly extends outwardly of said vehicle, said vent wing front edge having an outer surface which moves outwardly of said vehicle on swinging movement of said assembly toward said open position, a seal strip hingedly mounted on said windshield post in a position engageable with said outer surface of said vent wing front edge in the closed positions of said door and vent wing, coil spring means mounted on said post and connected to said seal strip and operable to move said strip to a position outside the path of travel of said vent wing front edge on movement of said door to its open position, and means on said door engageable with said spring means on movement of said assembly to its closed position for returning said seal strip to a position engageable with said vent wing front edge.

9. In an automotive vehicle having a windshield and a supporting post for one side of said windshield located on one side of said vehicle, a front door and vent wing assembly hingedly mounted on said one side of said vehicle for movement between a closed position in which the front edge of said vent wing is positioned adjacent and substantially parallel to at least a portion of said post and an open position in which said assembly extends outwardly of said vehicle, said vent wing front edge having an outer surface which moves outwardly of said vehicle on swinging movement of said assembly toward said open position, a seal strip hingedly mounted on said windshield post in a position engageable with said outer surface of said vent wing front edge in the closed positions of said door and vent wing, coil spring means mounted on said post and connected to said seal strip adjacent opposite ends thereof and operable to move said strip to a position outside the path of travel of said vent wing front edge on movement of said door to its open position, and adjustable means on said door engageable with said spring means on movement of said assembly to its closed position for returning said seal strip to a position engageable with vent wing front edge.

10. In an automotive vehicle having an upwardly extending windshield post and a hingedly mounted door disposed adjacent said post, a vent wing pivotally mounted on said door for movement between open and closed positions, said vent wing having an edge portion which is disposed adjacent and substantially parallel to a portion of said post in the closed position of said vent wing, said vent wing being pivotally mounted such that upon opening movement thereof at least a section of said edge portion moves inwardly of said vehicle, resilient seal means mounted on said post so as to be sealingly engaged by said edge section of said edge portion on movement of said vent wing to a closed position therefor, means movably mounted on said post in a supporting relation with said seal means for moving said seal means to a position outside the path of travel of said vent wing section on opening movement of said door, spring means on said post positioned in engagement with said seal supporting means and urging said seal means to said position, and means on said door operable on closing movement of said door to effect movement of said seal means to said vent wing engaging position therefor.

11. In an automotive vehicle having a windshield and a frame for said windshield which includes an upwardly extending windshield post at one side of said vehicle and a hingedly mounted door disposed adjacent said post on said one side of said vehicle, said door including frame means which cooperates with said post in the closed position of said door to define a window opening bounded on one side by said post, a vent wing pivotally mounted on said door for movement between an open position and a position closing said opening, said vent wing having an edge portion which is disposed adjacent and substantially parallel to a portion of said post in the closed position of said vent wing, said vent wing being pivotally mounted such that upon opening movement threof said edge portion moves inwardly of said vehicle, resilient seal means mounted on said post so as to be sealingly engaged by said edge portion on movement of said vent wing to a closed position therefor, means movably mounted on said post in a supporting relation with said seal means for moving said seal means to a position outside the path of travel of said vent wing edge portion on opening movement of said door, vertically spaced spring means on said post positioned in engagement with said seal supporting means and urging said seal means to said position, and means on said door engageable with said spring means on closing movement of said door so as to effect movement of said seal means to said window engaging position therefor in response to closing of said door.

References Cited in the file of this patent
UNITED STATES PATENTS

| | | |
|---|---|---|
| 1,646,743 | Bernard | Oct. 25, 1927 |
| 2,497,261 | Hicks | Feb. 14, 1950 |
| 2,631,887 | Wernig | Mar. 17, 1953 |
| 2,983,544 | Arlauskas | May 9, 1961 |